UNITED STATES PATENT OFFICE.

ANNA ORNSTEIN, OF VIENNA, AUSTRIA-HUNGARY.

PROCESS OF CLARIFYING WINE.

1,081,623.  Specification of Letters Patent.  Patented Dec. 16, 1913.

No Drawing.  Application filed March 19, 1912.  Serial No. 684,904.

*To all whom it may concern:*

Be it known that I, ANNA ORNSTEIN, born KAUFMANN, a citizen of Roumania, and resident of Vienna, Austria-Hungary, have invented certain new and useful Improvements in Processes of Clarifying Wine, of which the following is a specification.

This invention relates to an improved process of clarifying wine.

It is well known that wine can be clarified by the addition thereto of soy-bean flour produced by finely grinding soy-beans (*Soja hispida*). It has been found in practice, however, that owing to the high proportion of fatty matter contained in the soy-beans a portion of the fat becomes dissolved in the alcohol of the wine and, consequently, the flavor of the wine becomes thereby affected.

According to the present invention the soy-beans are freed from their contained fat prior to the use thereof for clarifying wine.

The removal of the fat from the beans can be effected during or after the grinding process by means of any of the well-known fat-extracting apparatus. By the action of the acid contained in the wine, the albuminous substances will be affected and assume a coagulated form; the coagulated albumen covers or envelops the impurities contained in the wine and inasmuch as the flour and albuminous portions fall, the impurities will be carried to the bottom of the clarifying vessel. A valuable advantage derived from the use of soy-flour from which the fat has been extracted is that the clarifying operation takes place more rapidly than with ordinary soy-flour owing to the de-fatted and consequently denser soy-flour sinking quicker through the wine, during which it carries down with it all impurities previously held in suspension in the wine. Obviously, no fatty matter can be dissolved from the soy-flour by the wine, and consequently the latter cannot acquire a fatty or rancid taste. The quantity of soy flour used is from 100 to 150 grams for 100 liters of wine.

What I claim is:

A process of clarifying wine consisting in adding to the wine the flour of ground soy-beans (*Soja hispida*) from which the fatty matter has been extracted.

Signed at Vienna, in the Province of Lower Austria, Austria, this twenty-seventh day of February, A. D. 1912.

ANNA ORNSTEIN, GEB KAUFMANN.

Witnesses:
   WILHELM BERGER,
   AUGUST FUGGER.